United States Patent
Gabbai

(10) Patent No.: US 10,135,975 B2
(45) Date of Patent: *Nov. 20, 2018

(54) CALL HOLDING MANAGEMENT

(71) Applicant: EBAY INC., San Jose, CA (US)

(72) Inventor: Jonathan Gabbai, London (GB)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,534

(22) Filed: Jan. 4, 2017

(65) Prior Publication Data
US 2017/0118332 A1     Apr. 27, 2017

Related U.S. Application Data

(63) Continuation of application No. 14/584,512, filed on Dec. 29, 2014, now Pat. No. 9,571,639.

(51) Int. Cl.
*H04M 3/42* (2006.01)
*H04M 3/428* (2006.01)
*H04M 3/523* (2006.01)
*H04M 3/02* (2006.01)

(52) U.S. Cl.
CPC ..... *H04M 3/4285* (2013.01); *H04M 3/42059* (2013.01); *H04M 3/4286* (2013.01); *H04M 3/523* (2013.01); *H04M 3/02* (2013.01); *H04M 3/4288* (2013.01); *H04M 2201/18* (2013.01); *H04M 2203/558* (2013.01)

(58) Field of Classification Search
CPC ............................. H04M 3/4286; H04M 3/523
USPC ........................................ 379/201.01, 211.01
See application file for complete search history.

(56) References Cited

U.S. PATENT DOCUMENTS

| | | |
|---|---|---|
| 6,122,346 A | 9/2000 | Grossman |
| 6,820,260 B1 | 11/2004 | Flockhart |
| 9,571,639 B2 | 2/2017 | Gabbai et al. |
| 2003/0112927 A1 | 6/2003 | Brown et al. |
| 2007/0225030 A1 | 9/2007 | Teague |
| 2008/0002022 A1 | 1/2008 | VanEpps |
| 2008/0095345 A1 | 4/2008 | Sharma et al. |
| 2009/0136014 A1 | 5/2009 | Bigue et al. |
| 2014/0057614 A1 | 2/2014 | Bhow et al. |

OTHER PUBLICATIONS

U.S. Appl. No. 14/584,512, Amendment and Response filed Aug. 18, 2015, 17 pages.
U.S. Appl. No. 14/584,512, Amendment and Response filed Dec. 9, 2015, 12 pages.
U.S. Appl. No. 14/584,512, Amendment and Response filed May 9, 2016, 13 pages.

(Continued)

*Primary Examiner* — Quynh Nguyen
(74) *Attorney, Agent, or Firm* — Wolfe-SBMC

(57) ABSTRACT

A system or a method may be provided that automatically distinguishes between a hold status and when someone live is talking on the phone. For example, the caller's phone may detect when the call holding has ended and a customer service representative is now actually on the line. The phone may alert the user to pick up the call at that time, such as utilizing a call-back mechanism. In an embodiment, the system may analyze and learn the various call holding music or recordings of call centers. The system may detect when the call holding music or recording ends in a telephone call and may alert the user.

20 Claims, 4 Drawing Sheets

(56) References Cited

OTHER PUBLICATIONS

U.S. Appl. No. 14/584,512, Amendment and Response filed Sep. 22, 2016, 12 pages.
U.S. Appl. No. 14/584,512, Notice of Allowance dated Oct. 4, 2016, 5 pages.
U.S. Appl. No. 14/584,512, Office Action dated May 18, 2015, 11 pages.
U.S. Appl. No. 14/584,512, Office Action dated Sep. 9, 2015, 12 pages.
U.S. Appl. No. 14/584,512, Office Action dated Feb. 8, 2016, 11 pages.
U.S. Appl. No. 14/584,512, Office Action dated Jun. 22, 2016, 13 pages.

CALL HOLDING MANAGEMENT

CROSS REFERENCE TO RELATED APPLICATION

This application is a continuation of and claims priority to U.S. patent application Ser. No. 14/584,512 filed on Dec. 29, 2014, the complete disclosure of which is incorporated by reference in its entirety.

BACKGROUND

Field of the Invention

The present invention generally relates to call holding and, in particular, to systems and methods for managing call holding.

Related Art

With the proliferation of telecommunication, many businesses and commercial activities are conducted by telecommunication. When customers call a merchant or a customer service center, the customers may be put on hold in a queue due to the volume of incoming calls to the merchant or the customer service center. As such, a customer may be put on hold for an unspecified amount of time before the customer can talk to a customer service representative. This unspecified wait time may be frustrating for the customer, who has to continuously listen and wait on the phone. Thus, there is a need for a system or a method that better manages call holding for the convenience of the customers.

Figure 1:
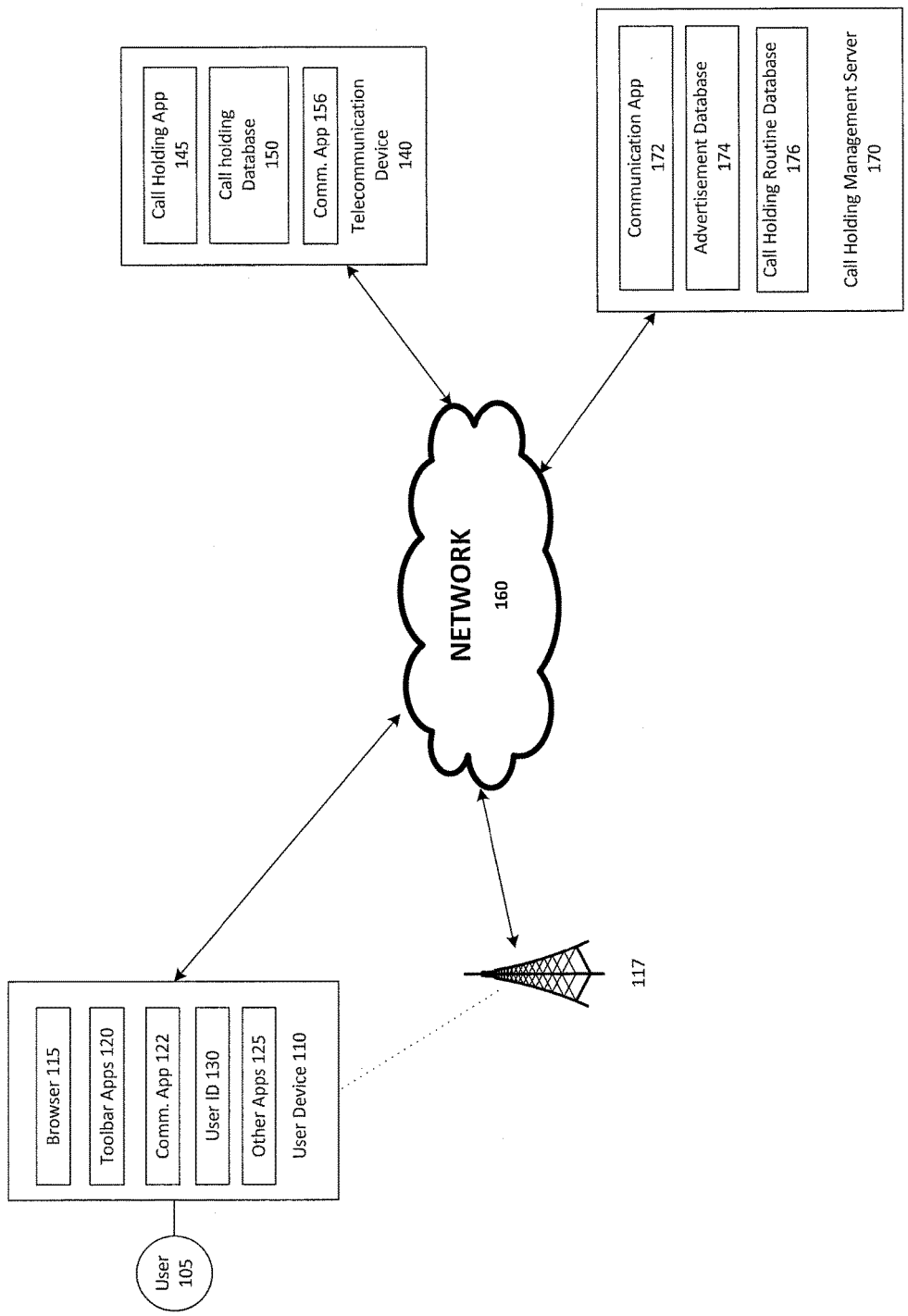
FIG. 1 is a block diagram of a networked system suitable for implementing a process for managing call holding according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or a method may be provided that automatically distinguishes between a hold status and when someone live is talking on the phone. For example, the caller's phone may detect when the call holding has ended and a customer service representative is now actually on the line. The phone may alert the user to pick up the call at that time, such as utilizing a call-back mechanism. In an embodiment, the system may analyze and learn the various call holding music or recordings of call centers. The system may detect when the call holding music or recording ends in a telephone call and may alert the user.

In an embodiment, the call centers may implement a standard tone to indicate start and end of call holding. The caller's phone may detect the standard tones indicating the start or end of call holding and may alert the user. As such, the user need not hold the phone during the call holding. Rather, the user may set the phone down. When the call holding ends, the system may notify the user by a notification, such as by an audio notification or vibration, which can be on the phone or another user device, such as a second phone, a wearable computing device (e.g., glasses, smart watch, etc.) and the like.

In an embodiment, the system may provide advertisements, such as video or audio advertisements to the user when the call holding is detected. As such, specific advertisements or promotions may be shown to the user as the user is waiting. The system may also provide additional information about the call holding, such as estimated wait time, the number of callers in front of the user in the queue, the number of callers behind the user in the queue, and the like. The system also may apply to calls between peers when one user puts another user on hold.

In an embodiment, the system may determine or customize advertisements or promotions for the user based on the user's profile, such as the user's purchase history, transaction history, browsing history and the like. The user may be presented with the customized promotions or advertisements during the call holding.

In an embodiment, the system may notify the user based on the user's notification preferences. The system may allow the user to designate how the user should be notified when the call holding is ended. In particular, the user may be notified by another device, such as a smart watch, another mobile device, or the like. As such, the user need not stay with the phone during call holding.

FIG. 1 is a block diagram of a networked system 100 suitable for implementing a process for managing call holding according to an embodiment. Networked system 100 may comprise or implement a plurality of communication devices, servers, and/or software components that operate to perform various telephone communications. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a telecommunication device 140, a cellular tower 117, and a call holding management server 170 in communication over network 160. A user 105 may utilize user device 110 to perform telephone communication via network 160. A user 105 may utilize user device 110 to initiate and receive telephone calls. A telecommunication device 140 may be operated by a merchant, a customer service center, or a general telephone call receiver. Telecommunication device 140 may be configured to receive telephone calls from the user device 110. The phone call may be routed through network 160. Network 160 may be a Public Switch Telephone Network (PSTN) including various telephone lines, fiber optic cables, cellular networks, communication satellites connected by switching/routing centers. In some embodiments, network 160 may include an Internet Protocol (IP) network configured to facilitate Voice over IP (VoIP) communications. Call holding management server 170 may provide call holding functions and features to the user device 110 when the user 105 is put on hold by the telecommunication device 140.

A telephone call may be initiated from user device 110. For example, the user 105 may dial a phone number of the telecommunication device 140 at user device 110. Thus, the telephone call may be designated for the telecommunication device 140. Network 160 may route the telephone call through network 160 to the telecommunication device 140. In an embodiment, user device 110 may be a cellular telephone and may be connected to cellular tower 117. Thus, the telephone call from the user device 110 may be routed to the telecommunication device 140 via cellular tower 117.

User device 110, telecommunication device 140, and call holding management server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication in the system 100. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over network 160, such as a user account for setting up a shopping list and/or merchant sites for viewing and purchasing products and services. User device 110 may also include one or more toolbar applications 120 which may be used, for example, to provide client-side processing for performing desired tasks in response to operations selected by the user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160. User device 110 includes one or more user identifiers 130 which may be implemented, for example, as operating system registry entries, cookies associated with browser application 115, identifiers associated with hardware of user device 110, telephone number associated with user device 110 or other appropriate identifiers, such as used for payment/user/device authentication. In one embodiment, user identifier 130 may be used by a telephone communication service provider to associate user 105 with a particular telephone account maintained by the telephone communication service provider.

User device 110 may include a communications application 122, with associated interfaces, enables user device 110 to communicate within system 100. For example, the communications application 112 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

User device 110 also may include applications that collect location data using Global Positioning System (GPS) to identify a location of user device 110. User device 110 may have a magnetometer configured to detect a moving or traveling direction of user device 110. Other means for collecting location data, such as WiFi devices, Near-Field Communication (NFC) devices, or the like also may be included in user device 110 for determining a location of user device 110. Thus, user device 110 may determine a current location of user device 110 and track a traveling direction of the user device 110 based on the collected location data.

The telecommunication device 140 may be maintained, for example, by a merchant, a customer service center, a company, or any other person or organization who receives telephone calls. The telecommunication device 140 may be configured to receive telephone calls. In an embodiment, the telecommunication device 150 may route telephone calls to appropriate persons or departments based on the request of the caller or based on an extension number entered by the caller. Telecommunication device 140 may be configured to receive VoIP and/or PSTN telephone calls.

Telecommunication device 140 may include a call holding application 145. The call holding application 145 may include hardware and/or software configured to place incoming calls on hold. For example, when the intended party for the telephone call is not available or is busy, the call holding application 145 may put the caller on hold. In an embodiment, the call holding application 145 may establish a queue if more than one callers are calling in for the same person or for the same telephone line. As such, the calls may be answered in the order they are received.

Telecommunication device 140 may include a call holding presentation database 145. The call holding presentation database 150 may store various presentations and/or content to be presented to the callers when the callers are put on hold. The presentations may include audio recordings, music, promotional recording, and the like. When a caller is put on hold, a presentation may be selected and played to the caller. The presentation may include music or advertisements. The presentation also may include announcements or notifications regarding the place or person the caller is calling.

Telecommunication device 140 also may include a communications application 156, with associated interfaces, enables the telecommunication device 140 to communicate within system 100. For example, the communications application 156 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

Cellular tower 117 may be operated by one or more telecommunication service providers. Cellular tower 117 may be configured to manage communication for cellular telephone devices located within the cellular tower 117's broadcast range. Cellular tower 117 may have access to network 160 and may provide internet and/or telephone services to cellular devices within their respective broadcast ranges. The user device 110 may be located within the broadcast range of cellular tower 117 and configured to facilitate cellular or data communication with cellular tower 117. Thus, the user device 110 may initiate and/or receive telephone calls by connecting to the cellular tower 117.

Call holding management server 170 may be operated by a call holding management service provider or by a call holding management software company. The call holding management server 170 may include a communications application 172, with associated interfaces, that enable the call holding management server 170 to communicate within system 100. For example, the communications application 172 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

The call holding management server 170 also may include an advertisement database 174 configured to store various advertisements, promotions, or other types of presentations to be presented to users when they are put on hold. The presentation materials may be organized into different types, interests, categories, and the like. Appropriate presentations may be selected for presentation to the users when they are put on hold based on the users' demographics and interests.

The call holding management server 170 may include a call holding routine database 176. The call holding routine database 176 may store the respective holding routines of various merchants, call centers, customer service centers, and any other persons or organizations that put callers on hold. The call holding routine database 176 may include call holding routine profiles of various entities. Each call holding routine profile may include the name of the entity or organization, the telephone number(s), routine call holding presentations, and the like. Thus, each call holding routine profile may store the presentations routinely played or presented to callers by the entity or organization when the callers are put on hold. The entity and/or organization may have multiple routine presentations or may have different routine presentations for different sections or departments of the entity.

Call holding routine profiles also may include other call holding information, such as average wait time of call holding, average queue length, pattern of call volume, and the like. The call holding management server 170 may obtain the call holding routine information from the various entities or organizations or may learn the routines from monitoring calls made to the entities or organizations. The call holding management may continuously learn and update the call holding routine profiles to reflect the most up-to-date call holding routines of various entities or organizations.

The call holding management server 170 may provide call holding functions and features to the user 105 at user device 110. For example, the call holding management server 170 may provide call holding routines to the user device 110 to help the user device 110 detect when the user 105 is put on hold and when the call holding ends. The call holding management server 170 also may provide advertisements or promotions to the user device 110 to be presented to the user 105 when the user 105 is put on hold during a telephone call.

Figure 2:
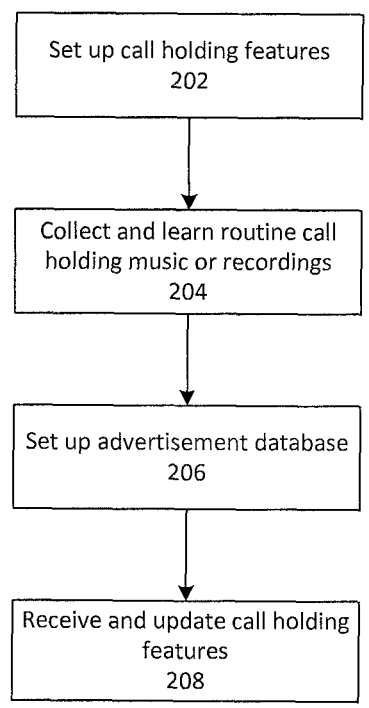
FIG. 2 is a flowchart showing a process for setting up a system for call holding according to one embodiment.

FIG. 2 is a flowchart showing a process 200 for setting up call holding management according to one embodiment. At step 202, call holding features may be set up at user device 110. The user 105 may download an application for call holding at the user device 110. The call holding application may provide various functions at the user device 110 for managing call holdings. For example, when a new telephone account is set up at the user device 110, the telephone account may be registered at the call holding management server 170. Telephone account information may include telephone number assigned to a telephone device, user information, service plan information, voice mail settings, telephone device type and model, call holding settings and preferences.

Call holding settings may have options for the user 105 to choose whether the user 105 wishes to turn on the call holding functions. The user 105 may choose the types of presentation or music to be displayed or provided to the user 105 at the user device 110 during call holding. The user 105 also may choose how the user 105 should be notified when call holding ends, such that the user 105 may resume the telephone call at the user device 110. For example, the user device 110 may emit a particular audio sound, visual signals, vibrate, or the like to notify the user 105 that the call holding has ended. In another example, the user device 110 may communicate the notification to another device of the user 105, such as the user 105's smart watch or laptop computer, which may vibrate, emit audio or visual signals, or the like to notify the user.

At step 204, the user device 110 or the call holding management server 170 may learn respective routine call holding music or recordings at various merchants, call centers, customer service centers, and the like. In an embodiment, merchants, call centers, customer service centers, and other organizations that have call holding features may provide the call holding management server 170 with their respective routine call holding music or recordings. These routine call holding music or recordings may be stored and archived in the respective call holding routine profiles at the call holding management server 170. In some embodiments, the user device 110 or the call holding management server 170 may learn these routine call holding music or recordings by monitoring telephone calls of customers who are put on hold. Audio signal pattern recognition techniques may be used to analyze and recognize routine music or recordings presented during call holding. The system may analyze and establish an audio pattern signature for each routine call holding music or recordings. For example, the audio pattern signature may include unique data points in audio signals, such as the frequency and amplitude v. time in the audio signals of the routine music or recording. The audio pattern signature then may be used to recognize the respective routine call holding music or recordings.

In an embodiment, various entities and organizations may agree upon a standard signal to indicate that the call is put on hold and another standard signal to indicate that the call holding has ended. The standard signals may be a unique sequence of audible sound which may or may not be heard by customers, but may be detected by the user device 110 or the call holding management center 170. Thus, when the user device 110 or the call holding management server 170 detects the specific signals, the user device 110 or the call holding management server 170 may determine when the call is being put on hold and when the call holding ends.

In an embodiment, the call holding management server 170 may implement an user interface for call center navigation. In particular, the user 105 may download a call holding application to user device 110 that may provide the user interface for call center navigation. In this case, the call holding management server 170 may provide a standard communication protocol by data or voice communication for implementing various call center functions and features between the user device 110 and the other party in the telecommunication. For example, the user interface may allow the user 105 to select a first option (Press 1) for additional call holding functions, select a second option (Press 2) to hear promotions or advertisements, select a third option (Press 3) to hear or view queue information on the call holding, select a fourth option (Press 4) to hear or view weather, sport, news, entertainment information, or the like. Thus, the call holding management server 170 may implement additional call holding functions for a telecommunication between the user 105 and the other party via the user interface. This may allow the user 105 to have a seamless user experience in obtaining additional call holding features when the user 105 is put on hold.

At step 206, the user device 110 or the call holding management server 170 may set up an advertisement or content database which may store various audio, video, or information presentations to be presented to the user 105 during call holding. The presentations may include music, advertisements, promotions, news, entertainment, sports, and any other information. The database may be organized into different types or categories of presentations. The system may allow the user 105 to select or choose different types of presentations to be presented to the user 105 during call holding.

At step 208, the user device 110 or the call holding management server 170 may continue to receive and update various call holding features. The system may allow the user 105 to manage various call holding features based on the user 105's preferences. The system also may continuously monitor and learn different routine call holding music or recordings of various merchants, call centers, customer service centers, and the like. Thus, routine call holding music or recordings may continuously be updated to reflect the most up-to-date routines of these organizations.

Accordingly, the user device 110 or the call holding management server 170 may set up various call holding features for the user 105. Routine call holding music or recordings at various merchants, call centers, customer service centers, and the like may be analyzed and learned by the system to better detect when the user 105 is put on hold on a telephone call. Further, the various call holding features and the routine call holding music or recordings may continuously be updated.

Figure 3:
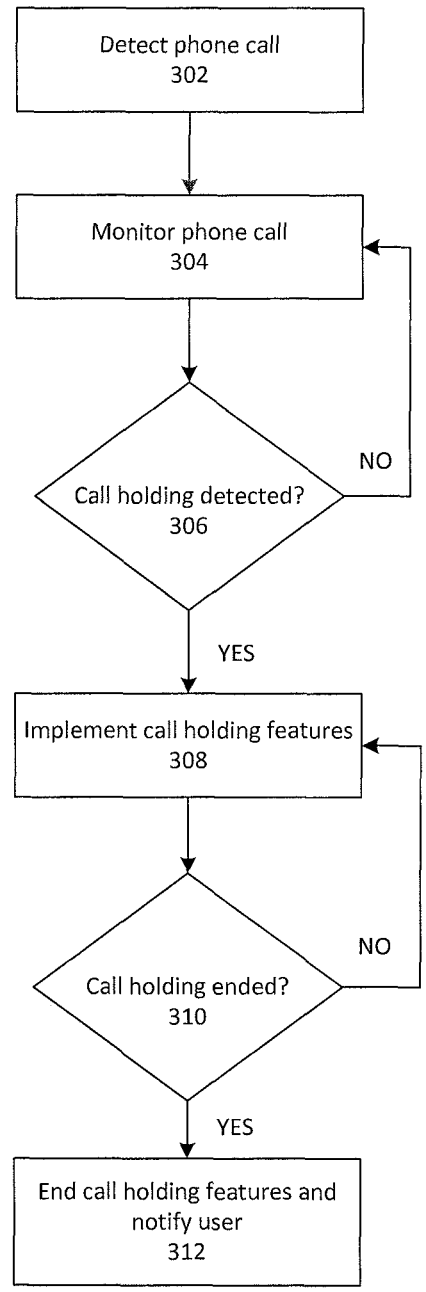
FIG. 3 is a flowchart showing a process for managing call holding according to one embodiment.

FIG. 3 is a flowchart showing a process 300 for implementing call holding management according to one embodiment. At step 302, the user device 110 or the call holding management server 170 may detect that a telephone call is started at the user device 110. The telephone call may be initiated by the user 105 at the user device 110 or the user 105 may receive telephone call from others at the user device 110. The user device 110 or the call holding management server 170 may identify the other party of the telephone call based on the telephone number dialed by the user 105 or based on the caller identification function. Based on the telephone number and/or the identity of the other party on the call, the system may determine whether the other party, such as the telecommunication device 140, has a call holding routine or function. For example, the other party may be a call center, a customer service center, a bank, a government entity, or the like who are likely to put the user 105 on hold. Thus, the system may anticipate or monitor signals or routine music or recordings that put the user 105 on hold.

At step 304, the user device 110 or the call holding management server 170 may monitor the telephone communication. In an embodiment, the telephone communication may be monitored by the user device 110 and any unique or notable occurrences during the telephone call may be communicated from the user device 110 to the call holding management server 170. For example, the user device 110 may determine the telephone number of the other party, such as by the caller identification function, and may communicate the telephone number of the other party to the call holding management server 170.

Based on the telephone number, the call holding management server 170 may search in the call holding routine database 176 to find call holding routines of the other party. The call holding routine database 176 may hold a comprehensive list of entities or organizations that have various call holding routines. Once the call holding routine associated with the telephone number is found, the call holding management server 170 may forward the audio signal signature or routine music or recordings used by the entity or organization associated with the telephone number to the user device 110. In particular, the unique audio signal patterns or signatures of the routine music or recordings may be communicated to the user device 110 to be used to detect the start or end of call holding music or recordings during the telephone call. As such, the user device 110 need not store a substantial amount of information regarding various call holding routines of many entities or organizations.

In an embodiment, the user device 110 may store the routine call holding music or recordings of entities or organizations the user 105 frequently calls. For example, the user 105 may frequently call the user 105's telecommunication service provider regarding phone bills. As such, the user device 110 may store the routine call holding music or recordings of the telecommunication service provider to detect when the user 105 is put on hold by the telecommunication service provider or when the call holding has ended.

At step 306, the user device 110 or the call holding management server 170 may monitor and detect whether call holding has occurred or whether the user 105 has been put on hold by detecting when the call holding routine music or recording begins. In an embodiment, the user device 110 or the call holding management server 170 may compare the audio communication occurring on the telephone call with the audio patterns of the routine call holding music or recordings. The system may detect that the user 105 has been put on hold when the audio communication of the telephone call matches or substantially matches those of the audio patterns of the routine call holding music or recordings.

In an embodiment, the system may detect when a conversation between the user 105 and the other party has ended or when the user 105 stops talking or is silent for an extended amount of time. For example, the call holding music or recording may be a non-verbal type recording. As such, when no human voices are detected, this may indicate that the user 105 is waiting or the user 105 has been put on hold. In this case, the system may begin to analyze the audio communication and may determine whether the audio communication matches those of the routine call holding music or recordings. Thus, the system need not continuously analyze the entire audio communication, but may monitor or analyze the audio communication when a conversation has ended or when no human voice is heard. This may conserver the processing resources of the system.

In some embodiments, the routine call holding music or recordings may be presented repeatedly in a loop during the call holding. The user device 110 may monitor and recognize that the routine call holding music or recordings after a few repeatedly loops. The user device 110 may then determine that the user 105 is currently put on hold based on the repeated loops.

In an embodiment, the various entities or organizations may agree on a standard signal for indicating when call holding begins and another standard signal when call holding ends. In another example, a specific signal may continuously be presented during call holding. As such, the system may determine when the user 105 has been put on hold and when the call holding has ended based on the standard signals detected in the audio communication.

When no call holding is detected at step 306, the process may return to step 304 at which the system may continue to monitor the telephone communication. When call holding is detected at step 306, the system may implement call holding features at step 308. The user 105 may choose from various call holding features. In an embodiment, the user 105 may select other types of video, audio, or informational presentations the user 105 prefers and the system present the selected presentations to the user 105 at user device 110. For example, the user 105 may select and view sports, news, weather, or the like on the user device 110. In another example, the user 105 may select to view advertisements or promotional presentations in exchange for offers, coupons, or certain customer rewards. The call holding management server 170 may provide the various presentations to the user device 110 to be presented to the user 105.

In an embodiment, the system may automatically select presentations for the user 105 based on the user 105's preferences and interests. For example, based on the user 105's browsing history, purchase history, music or video playlist, and other sources, the system may determine types or categories of presentations, such as new, music, movie, videos, and the like that the user 105 may be interested in listening or viewing.

In an embodiment, the call holding management server 170 may provide information regarding call holding to the user 105. For example, the call holding management server 170 provide statistical information regarding the call holding queues, such as average wait time, average queue length, estimated wait time, the position of the user 105 in the queue, and the like. Thus, the user 105 may be informed regarding how long the user 105 is estimated to be on hold. The call holding management server 170 may determine or obtain the call holding queue information based on statistical history of the call holding queue. The call holding management server 170 may also determine or obtain the call holding queue information from crowdsourcing, such as obtaining information from other callers or customers who are also calling or are put on hold.

In an embodiment, the call holding management server 170 may allow the user 105 to put down the user device 110 or leave the user device 110. For example, the user 105 may put the telephone call on mute and may leave the user device 110 to perform other tasks while the user 105 is put on hold. During this time, the system may continue to monitor the call holding for the user 105 while the routine call holding music and/or recordings are muted. The user 105 may select how the user 105 is to be notified when the call holding ends. Based on the user 105's situation and setting, the user 105 may choose to be notified by the user device 110 or by another device of the user 105.

In an embodiment, when the user 105 is put on hold, the system may present call holding options to the user 105 at the user device 110. The user 105 may select from call holding options, such as stay on the line without enhanced call holding features, select and view other presentations, view advertisements or promotions to obtain rewards, leave the telephone call, and the like. If the user 105 chooses to leave the telephone call or leave the user device 110, the system may present options on how the user 105 is to be notified to return to the telephone call or to the user device 110 when the call holding ends. The notification options may include notification at the user device 110, notification at another device of the user 105. The user 105 also may choose the type of notification, such as by an audio sound, by a visual signal, by a textual message and the like.

If the user 105 selects notification by another device, the system may request information regarding another device. For example, the user 105 may select to be notified by a smart watch wirelessly connected to the user device 110. The system may request for the information about the smart watch and how the notification at the smart watch should be presented, such as by vibration or by a text message. In another example, the user 105 may select to be notified by another device not connected directly to the user device 110, such as a user 105's laptop or the user 105's home entertainment system. The system may request contact information, such as email address, IP address or the like, by which the system may send the notification to the device.

At step 310, the system may determine whether the call holding has ended. In an embodiment, the system may determine that the call holding has ended when the audio communication on the telephone call no longer match the audio signal patterns of the routine call holding music or recordings In an embodiment, the system may detect the standard signals that indicate the end of the call holding, as agreed on by various entities or organizations. In still another embodiment, the system may detect that the repeated looping of the routine call holding music or recording has ended.

In some embodiments, the system may detect that a live person has started talking in the audio communication indicating the end of call holding. For example, the routine call holding music may be certain instrumental music. The system may distinguish live person's human voice from the call holding instrumental music. In another example, the system may recognize certain words or phrases spoken by a live person when the live person begins to talk, such as "hello" or "are you still there?" Thus, the system may determine that the call holding has ended by various techniques or a combination of different techniques.

If the system detects that the call holding has not ended at step 310, the process may return to step 308 at which the call holding features may continue to be implemented. If the system determines that the call holding has ended at step 310, the system may end the call holding features and may notify the user 105 at step 312. In an embodiment, the system may end the presentations or advertisements being presented to the user 105 at the user device 110 and may redirect the user 105 back to the phone call. For example, the user device 110 may display a message "Call holding has ended, tap "ok" to return to phone call." The user 105 may be provided with the option of viewing or listening to the remaining portion of the presentation later after the phone call is ended.

In an embodiment, the system may notify the user 105 who left the phone call or left the user device 110 to do other tasks. In this case, the system may notify the user 105 based on the notification method previously requested by the user 105. For example, the system may call, text, email, or cause the user device 110 or another device of the user 105 to emit audio or visual signals, or vibrate. In an embodiment, the system may inform the other party of the phone call that the user 105 is being notified. Thus, the other party may be informed to wait for the user 105's return.

In another embodiment, the type of notification, type of delivery (e.g., sound, vibration, visual indicator, etc.), and/or device receiving the presentation may be dependent on various factors, such as location of a user device, background noise, time of day, etc. For example, if a lot of background noise is detected, such as at a train station or social event, the notification may be with a louder audio signal, a visual signal, and/or a vibration. In another example, if the user is detected at a library or movie theater, the notification may be a silent vibration. As such, an appropriate notification may be delivered that results in a higher likelihood the user notice the notification and/or less disturbance to others near the user.

By using the above process 300, call holding in a telephone communication may be detected and enhanced call holding functions may be implemented for the user 105. As such, the user 105 may be presented with preferred content or the user 105 may be allowed to leave the phone call during the call holding. The system also may detect when the call holding has ended and may notify the user 105 to return to the phone call. As a result, the user 105 may have a better experience during a call holding period.

Figure 4:
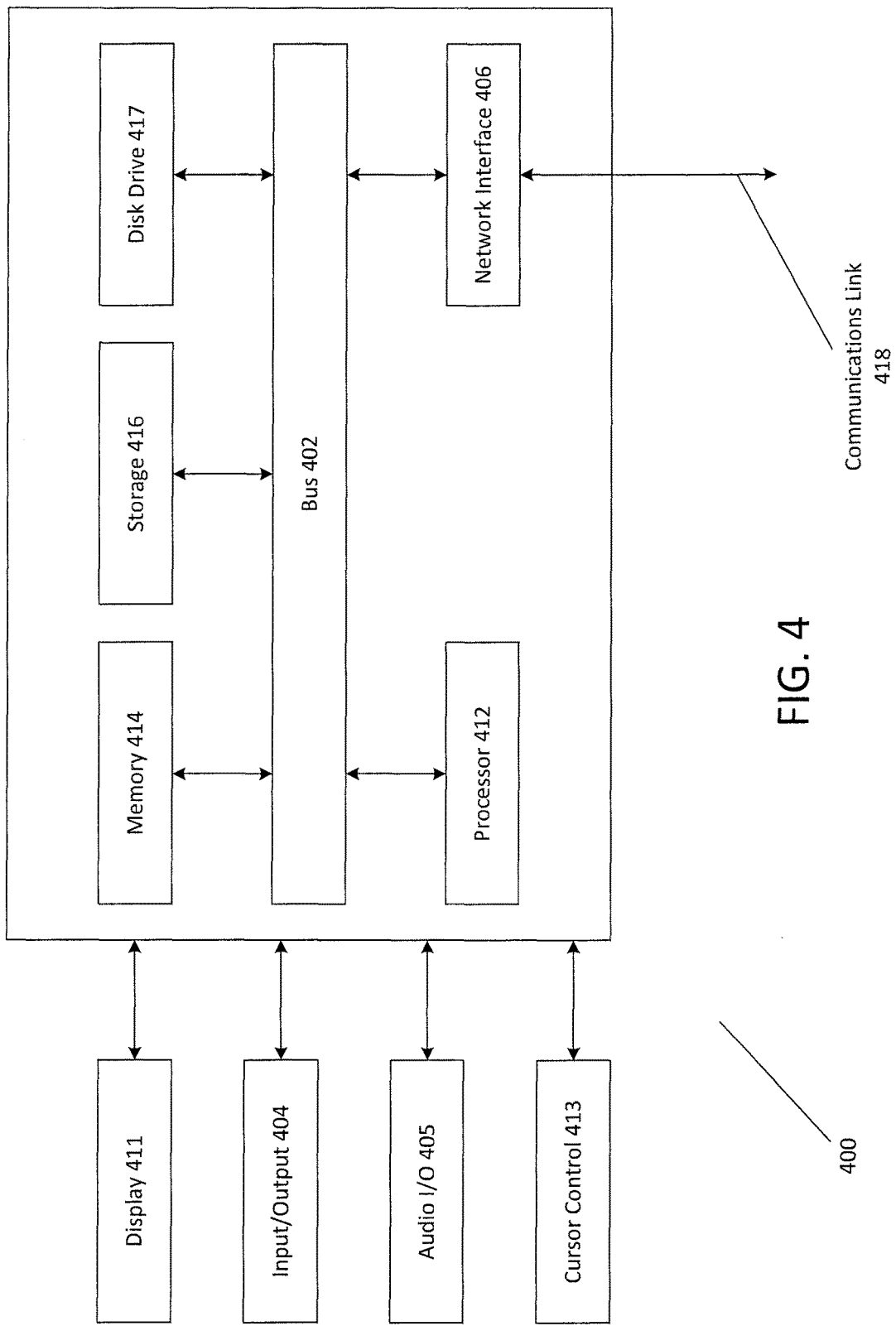
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with other communication devices and the network 160. The merchant and/or payment provider may utilize a network computing device (e.g., a network server) capable of communicating with other communication devices and the network 160. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one processor; and
   a memory coupled to the at least one processor and storing instructions that, when executed by the at least one processor, perform a method, comprising:
   detecting an electronic communication between a first communication device and a second communication device;
   determining an identifier associated with the second communication device;
   determining an audible communication holding routine associated with the second communication device based, at least in part, on the identifier associated with the second communication device;
   monitoring the electronic communication to automatically determine whether the electronic communication is put on hold by the second communication device based, at least in part, on detecting that the audible communication holding routine is included in the electronic communication, said detecting the audible communication holding routine being performed by using an audio pattern signature of the audible communication holding routine; and
   when it is determined that the electronic communication is put on hold, presenting one or more communication holding options to the first communication device.

2. The system of claim 1, wherein the electronic communication is a telephone communication.

3. The system of claim 1, wherein the identifier is a telephone number of the second communication device.

4. The system of claim 1, wherein the one or more communication holding options are implemented via a mobile app on the first communication device.

5. The system of claim 1, wherein the one or more communication holding options comprises one or more of:
   displaying call statistical information;
   displaying advertisements;
   displaying news; or
   setting up notification options to provide a notification to a user of the first communication device when the hold on the communication ends.

6. The system of claim 1, wherein the communication holding routine associated with the second communication device is retrieved from a communication holding routine database using the identifier associated with the second communication device.

7. The system of claim 1, wherein the determining that the electronic communication is put on hold comprises:
   monitoring the electronic communication using the audio pattern signature of the communication holding routine to detect whether a communication holding has occurred; and
   determining that the electronic communication is put on hold when one or more portions of the electronic communication match the audio pattern signature of the communication holding routine.

8. A method, comprising:
   detecting an electronic communication between a first communication device and a second communication device;
   determining an identifier associated with the second communication device;
   determining an audible communication holding routine associated with the second communication device based, at least in part, on the identifier associated with the second communication device;
   automatically determining whether the electronic communication is put on hold by the second communication device based, at least in part, on the audible communication holding routine associated with the second communication device and a comparison with an audio pattern signature of the audible communication holding routine; and
   when it is determined that the electronic communication is put on hold, presenting one or more communication holding options to the first communication device.

9. The method of claim 8, wherein the electronic communication is a telephone communication.

10. The method of claim 8, wherein the identifier is a telephone number of the second communication device.

11. The method of claim 8, wherein the one or more communication holding options are implemented via a mobile app on the first communication device.

12. The method of claim 8, wherein the one or more communication holding options comprises one or more of:
    displaying call statistical information;
    displaying advertisements;
    displaying news; or
    setting up notification options to provide a notification to a user of the first communication device when the hold on the communication ends.

13. The method of claim 8, wherein the audio pattern signature of the communication holding routine associated with the second communication device is retrieved from a communication holding routine database using the identifier of the second communication device.

14. The method of claim 8, wherein the determining that the electronic communication is put on hold comprises:
    monitoring the electronic communication using the audio pattern signature of the communication holding routine to detect whether a communication holding has occurred; and
    determining that the electronic communication is put on hold when one or more portions of the electronic communication match the audio pattern signature of the audible communication holding routine.

15. A non-transitory computer-readable storage medium encoding computer-executable instructions that, when executed by a processor, perform a method, comprising:
    monitoring an electronic communication between a first device and a second device;
    determining an audible communication holding routine associated with the communication device based, at least in part, on an identifier associated with the second device;
    automatically determining when a hold is applied to the electronic communication based, at least in part, on detecting the audible communication holding routine associated with the second device by performing a comparison between an audio pattern signature of the audible communication routine with the electronic communication; and when it is determined that the hold has been applied, presenting one or more communication holding options to the first device.

16. The non-transitory computer-readable storage medium of claim 15, wherein the electronic communication is a telephone communication.

17. The non-transitory computer-readable storage medium of claim 15, wherein the identifier is a telephone number of the second device.

18. The non-transitory computer-readable storage medium of claim 15, wherein the one or more communication holding options are implemented by a mobile app executing on the first device.

19. The non-transitory computer-readable storage medium of claim 15, wherein the one or more communication holding options comprises one or more of:
displaying call statistical information;
displaying advertisements;
displaying news; or setting up notification options to provide a notification to a user of the first communication device when the hold on the communication ends.

20. The non-transitory computer-readable storage medium of claim 15, wherein the determining that the electronic communication is put on hold comprises:
monitoring the electronic communication using the audio pattern signature of the communication holding routine to detect whether a communication holding has occurred; and
determining that the electronic communication is put on hold when one or more portions of the electronic communication match the audio pattern signature of the communication holding routine.

* * * * *